US009151184B2

(12) United States Patent
Chu

(10) Patent No.: US 9,151,184 B2
(45) Date of Patent: Oct. 6, 2015

(54) HEAT EXCHANGERS, BOILERS, AND SYSTEMS INCORPORATING THE SAME

(71) Applicant: Mosi Chu, Setauket, NY (US)

(72) Inventor: Mosi Chu, Setauket, NY (US)

( * ) Notice: Subject to any disclaimer, the term of this patent is extended or adjusted under 35 U.S.C. 154(b) by 0 days.

(21) Appl. No.: 14/200,343

(22) Filed: Mar. 7, 2014

(65) Prior Publication Data

US 2014/0250888 A1    Sep. 11, 2014

Related U.S. Application Data

(60) Provisional application No. 61/774,790, filed on Mar. 8, 2013.

(51) Int. Cl.

| F01K 7/16 | (2006.01) |
|---|---|
| F24H 1/10 | (2006.01) |
| F28D 1/047 | (2006.01) |
| F24H 8/00 | (2006.01) |
| F22D 1/32 | (2006.01) |
| F22D 1/28 | (2006.01) |
| F01K 21/04 | (2006.01) |
| F22B 9/02 | (2006.01) |
| F22B 37/40 | (2006.01) |
| F22D 1/30 | (2006.01) |

(52) U.S. Cl.
CPC . *F01K 7/16* (2013.01); *F01K 21/04* (2013.01); *F22B 9/02* (2013.01); *F22B 37/40* (2013.01); *F22D 1/28* (2013.01); *F22D 1/30* (2013.01); *F22D 1/32* (2013.01); *F24H 1/10* (2013.01); *F24H 1/107* (2013.01); *F24H 8/003* (2013.01); *F28D 1/047* (2013.01); *Y02B 30/104* (2013.01)

(58) Field of Classification Search
CPC ............ F22B 37/40; F01K 21/04; F22D 1/28
USPC .......................................................... 122/30
See application file for complete search history.

(56) References Cited

U.S. PATENT DOCUMENTS 4,290,267 A * 9/1981 Buchner .......................... 60/648
4,586,340 A * 5/1986 Kalina ............................ 60/673
(Continued)

FOREIGN PATENT DOCUMENTS

DE    102007056113 A1    7/2008

OTHER PUBLICATIONS

International Search Report from corresponding application PCT/US2014/021761 dated Sep. 11, 2014.

*Primary Examiner* — Kenneth Bomberg
*Assistant Examiner* — Wesley Harris
(74) *Attorney, Agent, or Firm* — Carter, DeLuca, Farrell & Schmidt, LLP

(57) ABSTRACT

A heat exchanger includes an enclosure having a separator disposed therein that divides the heat exchanger into a mixing area and a heat exchange area. The mixing area is configured to receive a hot fume and droplets of a liquid for mixing with each other to form a fume-droplet vapor mixture. The mixture is configured to flow through orifices of the separator into the heat exchange area. A plurality of magazines is disposed within the heat exchange area of the first enclosure. Each magazine defines a cavity. The cavities are disposed in communication with one another. A lower-most magazine is configured to receive a receiver medium that is pumped through the cavity of each successive magazine to an upper-most magazine. The mixture is configured to circulate about the magazines to incrementally heat the receiver medium as the receiver medium is pumped through the cavity of each successive magazine.

17 Claims, 7 Drawing Sheets

(56) References Cited

U.S. PATENT DOCUMENTS

| | | | |
|---|---|---|---|
| 4,589,893 A * | 5/1986 | Franzolini et al. | 55/434.4 |
| 4,738,226 A | 4/1988 | Kashiwazaki et al. | |
| 4,799,941 A * | 1/1989 | Westermark | 95/199 |
| 2011/0232286 A1* | 9/2011 | Mishima et al. | 60/670 |

* cited by examiner

US 9,151,184 B2

HEAT EXCHANGERS, BOILERS, AND SYSTEMS INCORPORATING THE SAME

CROSS-REFERENCE TO RELATED APPLICATIONS

This application claims the benefit of, and priority to, U.S. Provisional Patent Application No. 61/774,790, filed on Mar. 8, 2013, the entire contents of which are hereby incorporated herein by reference.

BACKGROUND

1. Technical Field

The present disclosure relates to boilers and, more particularly, to efficient boilers configured to heat a receiver medium, e.g., water, from an approximately room temperature liquid to a hot liquid, vapor, and/or superheated vapor (depending on the particular purpose). The present disclosure also relates to systems incorporating such boilers, e.g., stove systems, home heating systems, power generating systems, etc.

2. Background of Related Art

In conventional boilers, a source medium, e.g., a hot gaseous fume, is utilized to heat a receiver medium, e.g., water, via heat exchange through a thermally conductive exchange material disposed therebetween. However, resistance in such conventional boilers results in much of the heat energy escaping as waste, severely reducing the efficiency of these boilers.

Whether boiling a pot of water using a gas stove, using an oil burner to generate water vapor for a home heating system, generating superheated water vapor for a steam turbine, or utilizing any other conventional boiler system, resistance in the heat exchange process results from the formation of a thin layer of molecules on the surface of the exchange material, e.g., the thermally conductive material disposed between the source medium and the receiver medium, and serves to hamper heat exchange therebetween. In particular, according to boundary layer theory, in such conventional boilers, molecules from the source medium become stuck to the surface of the exchange material because of friction and eventually attain the same temperature as the exchange material, forming a so-called boundary layer. This boundary layer inhibits the exchange of heat from the source medium to the receiver medium through the exchange material, and is referred to as boundary layer resistance.

To reduce boundary layer resistance, the rate or speed at which the source medium is circulated through the boiler has to be increased for momentum exchange between the boundary molecules and the main stream molecules of the source medium to occur. As the speed increases, a turbulent flow pattern results with some of the colder boundary molecules being displaced by the hotter main stream molecules. This is referred to as forced convection, and results in enhanced heat exchange.

However, increasing the speed of the source medium is not without shortcomings. In particular, the source medium must be confined within the boiler for a sufficient amount of time to allow the receiver medium to absorb enough energy to be sufficiently heated to the desired temperature, e.g., a hot liquid, vapor, or superheated vapor. Unfortunately, confinement of the source medium within the boiler is not easily achieved because the source medium has a tendency to escape and the hotter the source medium, the faster it escapes. In other words, the constraint on efficiency of a boiler is that in a limited time interval, quick and effective heat exchange is required.

Regardless of how turbulent the source medium becomes, it cannot deliver enough energy for the receiver medium to absorb to sufficiently heat the receiver medium before the source medium escapes through the chimney. This is because of an impedance mismatch between the source medium and the receiver medium that exists in conventional boilers. This impedance mismatch in conventional boilers stems from the fact that the energy densities ($BTU/ft^3$) of the source medium (typically a gaseous fume) is several orders of magnitude less than that of the receiver medium (typically liquid water), due to the different thermodynamic parameters, e.g., density ($lb/ft^3$), specific heat ($BTU/lb \times °$ F.), and conductivity ($BTI/hr.\text{-}ft\ °$ F.), of the source medium and the receiver medium. Such a severe impedance mismatch between the energy provider, i.e., the source medium, and the energy receiver, i.e., the receiver medium, renders the source medium unable to adequately transfer heat to the receiver medium and, as a result, conventional boilers are inefficient.

SUMMARY

The present disclosure provides heat exchangers, boilers, and systems incorporating the same that have improved heat exchange efficiency. The improved heat exchange efficiency of these boilers and systems is enabled by minimizing the dominant resistance against heat exchange, i.e., the impedance mismatch between the source medium (e.g., a hot gaseous fume) and the receiver medium (e.g., water). Once this dominant resistance has been minimized, the source medium is able to deliver a far greater percentage of its energy to heat the receiver medium via the least resistance path. As a result, efficiency is maximized while waste is minimized. Thus, although the second law of thermodynamics, i.e., the Carnot cycle, prohibits the achievement of an exact impedance match between a liquid and a vapor in practice, the boilers and systems of the present disclosure are configured to minimize the impedance mismatch, enabling these boilers and systems to approach optimal efficiency.

The boilers of the present disclosure, depending on a particular purpose, include the following: a fume generator, e.g., a combustion chamber (for burning coal or any other suitable fossil fuel, biomass fuel, or other fuel); a primary heat exchanger for heating a receiver medium from an approximately room temperature liquid to a hot liquid and/or vapor; and, optionally, a secondary heat exchanger for heating the receiver medium to a superheated vapor.

The primary and secondary exchangers are specifically configured to minimize the dominant resistance against heat exchange acting thereon, i.e., the impedance mismatch between the source medium (e.g., a hot gaseous fume generated by combusting a fossil fuel) and the receiver medium (e.g., water). With respect to the primary heat exchanger, which is configured to heat the water from a liquid at approximately room temperature to a hot liquid and/or a vapor up to about 700° F., the impedance mismatch between the hot gaseous fume and the water is reduced by mixing the hot gaseous fume with a momentum transfer agent, e.g., droplets of water.

In use, the droplets of water, which have substantially similar thermodynamic parameters as the liquid water receiver medium, are heated by the hot gaseous fume and vaporized. Upon contacting the surface of the exchange material, the vaporized droplets condense as energy is transferred from the droplets to the liquid water receiver medium through the exchange material. As such, heat exchange occurs between the water droplets (the momentum transfer agent) and the water (the receiver medium), which have similar thermodynamic parameters and a minimal impedance differential. In other words, an impedance matching condition is approached. Although, as noted above, exact impedance matching cannot be achieved, approaching an impedance matching condition minimizes the dominant resistance and maximizes the efficiency of heat exchange.

With respect to the secondary heat exchanger, which is configured to heat the receiver medium from a vapor to a superheated vapor up to or above 1000° F., both the source medium and the receiver medium are gaseous (e.g., hot gaseous fume and water vapor, respectively). The hot gaseous fume includes individual water vapor molecules, in addition to other, heavier molecules. The individual water vapor molecules of the hot gaseous fume serve as the momentum transfer agent to the individual water vapor molecules of the receiver medium. More specifically, in the second heat exchanger, condensation and evaporation do not occur, but, rather, heat transfer is effected through elastic collisions between the single water vapor molecules of the receiver medium and the single water vapor molecules (the momentum transfer agent) of the hot gaseous fume. Since the receiver medium and the momentum transfer agent include identical molecules, e.g., individual water vapor molecules, there is an exact impedance match therebetween and the efficiency of heat exchange via the elastic collisions therebetween is maximized.

In conjunction with the boilers and systems of the present disclosure being configured to provide efficient heat exchange, the boilers and systems of the present disclosure may further be configured for use with microprocessor-based intelligence, associated digital devices, and/or other suitable control or feedback systems, thus enabling the boilers and systems to be dynamically adjusted to maximize efficiency.

Heat exchangers, boilers, and/or systems incorporating the same provided in accordance with the present disclosure may include any or all of the above features or any of the other features detailed herein. In particular, in accordance with aspects of the present disclosure, a heat exchanger is provided including a first enclosure. A separator disposed within the divider divides the volume defined by the first enclosure into a mixing area and a heat exchange area. The separator defines a plurality of orifices. The mixing area receives a hot fume and individual molecule droplets of a liquid for mixing with each other to form a fume-droplet vapor mixture. The mixture passes through the orifices of the separator into the heat exchange area. A plurality of magazines are disposed within the heat exchange area of the first enclosure. The magazines include a lower-most magazine, an upper-most magazine, and at least one intermediate magazine disposed therebetween. Each magazine defines a cavity. The cavities of the magazines are disposed in communication with one another. The lower-most magazine is configured to receive a receiver medium that is pumped through the cavity of each successive magazine from the lower-most magazine to the upper-most magazine. The mixture circulates about the magazines to incrementally heat the receiver medium as the receiver medium is pumped through the cavity of each successive magazine.

In aspects, the separator includes at least one baffle plate.

In aspects, the heat exchanger includes a feeding tube extending at least partially through the mixing area. The feeding tube connects to a source of liquid and defines a plurality of pin holes through which the liquid is urged to spew the individual molecule droplets of the liquid into the mixing area.

In aspects, the liquid is water and the receiver medium is water.

In aspects, the upper-most magazine outputs water vapor.

In aspects, each magazine includes a plate and a cover. The plate defines a recess and has a flange extending about an outer periphery of the recess. The cover is disposed about the recess of the plate to define and enclose the cavity therebetween.

In aspects, a depth of the cavity of at least one of the magazines is equal to a vertical spacing between adjacent magazines.

In aspects, the upper-most magazine is configured as an evaporator having an enlarged cavity defining an upper portion and a lower portion. The upper portion of the cavity retains vapor, while the lower portion of the cavity retains liquid.

In aspects, the first enclosure is formed from a plurality of panels. At least two of the panels are joined via a flexible coupling including a sealing blanket disposed within a gap defined between the at least two panels.

In aspects, a second enclosure is disposed about the first enclosure and defines an insulative area therebetween.

In aspects, a chimney outlet is defined towards the base of the first enclosure within the heat exchange area thereof. The chimney outlet enables the flow of a cooled mixture out of the heat exchange area.

In aspects, the orifices defined through the separator are arranged to permit the mixture to pass through the orifices of the separator into the heat exchange area between each pair of adjacent magazines.

Also provided in accordance with the present disclosure is a boiler for a home heating system. The boiler includes a fume generator configured to produce a hot fume and a heat exchanger secured to the fume generator. The heat exchanger is similar to the heat exchanger detailed above.

In aspects, the upper-most magazine of the heat exchanger is disposed in thermal communication with a pot such that the heated receiver medium is capable of heating water disposed within the pot to about 212° F. Alternatively or additionally, the upper-most magazine outputs vapor to a home heating system.

In aspects, the fume generator includes a housing having a divider disposed therein that divides the housing into a combustion chamber and a gathering chamber. The combustion chamber is configured to receive fuel to be burned to produce a hot fume. The hot fume passes through apertures defined within the divider and into the gathering chamber for output to the heat exchanger.

Also provided in accordance with the present disclosure is a power generating system. The system includes a fume generator that produces a hot fume, a primary heat exchanger, a secondary heat exchanger, and a steam turbine. The primary heat exchanger is similar to the heat exchangers detailed above and outputs vapor at about 700° F. The secondary heat exchanger receives the vapor output from the upper-most magazine of the primary heat exchanger, heats the vapor to a superheated vapor of at least 1000° F., and outputs the superheated vapor. The steam turbine receives the superheated vapor from the secondary heat exchanger and utilizes the superheated vapor to drive an electrical generator.

In aspects, the steam turbine at least one of returns liquid water to the primary heat exchanger as the receiver medium and returns liquid water to the primary heat exchanger as the liquid from which the droplets of liquid are produced.

In aspects, the secondary heat exchanger receives a relatively hotter mixture from the primary heat exchanger for heating the vapor and returns a relatively cooler mixture to the primary heat exchanger to facilitate heating of the receiver medium within the primary heat exchanger.

In aspects, the system further includes a CPU that controls a flow rate of the receiver medium into the primary heat exchanger to maintain a target temperature of about 700° F. for the vapor exiting the primary heat exchanger.

BRIEF DESCRIPTION OF THE DRAWINGS

Aspects and features of the present disclosure are described herein with reference to the accompanying drawings, wherein.

DETAILED DESCRIPTION

Figure 1:
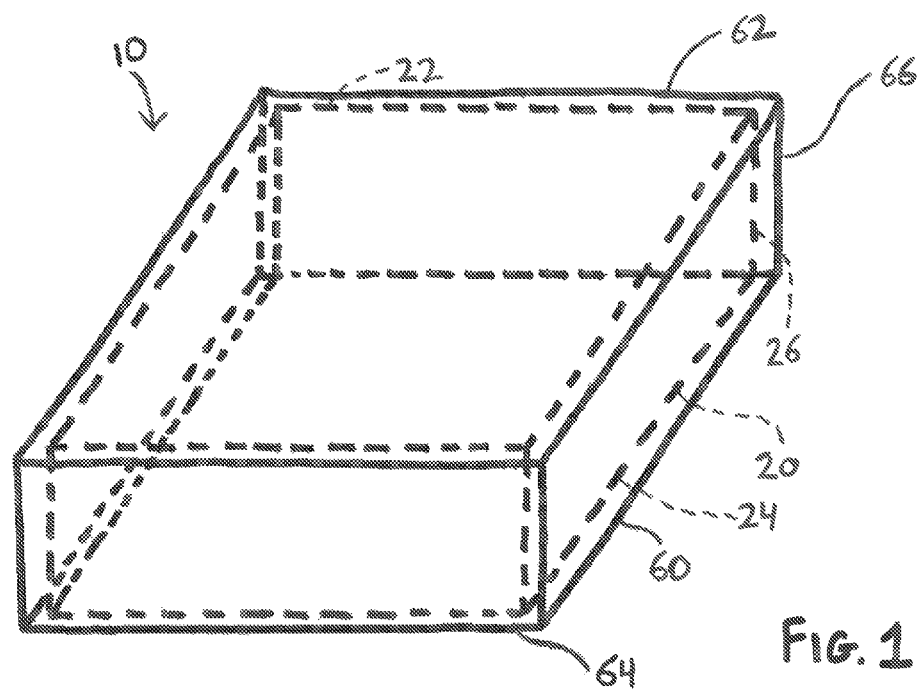
FIG. 1 is a perspective view of a primary heat exchanger provided in accordance with the present disclosure.

Various embodiments of the present disclosure will now be described in detail with reference to the drawings, wherein like reference numerals identify similar or identical elements. In the following description, well known functions or constructions are not described in detail to avoid obscuring the present disclosure. To the extent consistent, any of the aspects and/or features of any of the embodiments detailed herein may be used in conjunction with any of the aspects and/or features of any of the other embodiments detailed herein.

The present disclosure provides heat exchangers, boilers, and systems incorporating the same wherein the boilers generally include a fume generator, and a primary heat exchanger for heating a receiver medium using the source medium from an approximately room temperature liquid to a hot liquid and/or vapor. In some embodiments, depending on a particular purpose, a secondary heat exchanger is provided for further heating the receiver medium to a superheated vapor. It should be noted that the primary heat exchanger requires a majority of the energy of the boilers and/or systems and, thus, is an important component to consider with respect to maximizing efficiency. As such, the general configuration of the primary heat exchanger will be described first below, followed by a description of the various embodiments of boilers and systems provided in accordance with the present disclosure and the specific features of the primary heat exchanger, fume generator, and/or a secondary heat exchanger incorporated therein.

General Configuration and Operation of the Primary Heat Exchanger

Figure 2:
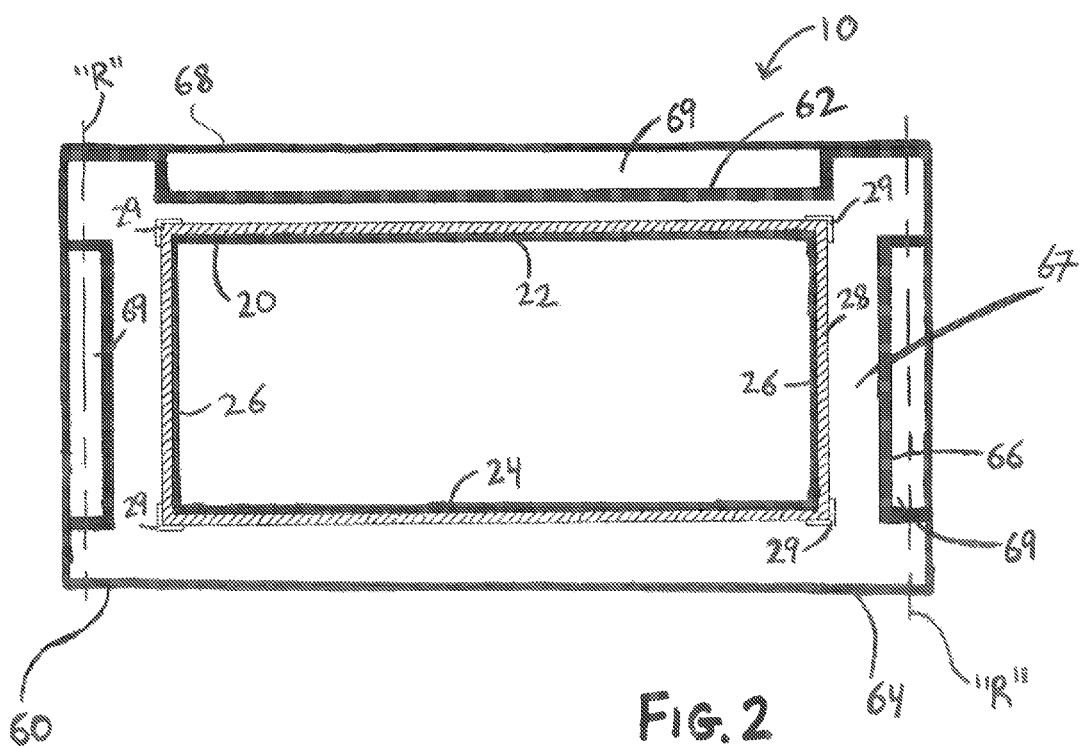
FIG. 2 is a cross-sectional view of the primary heat exchanger of FIG. 1.
Figure 3:
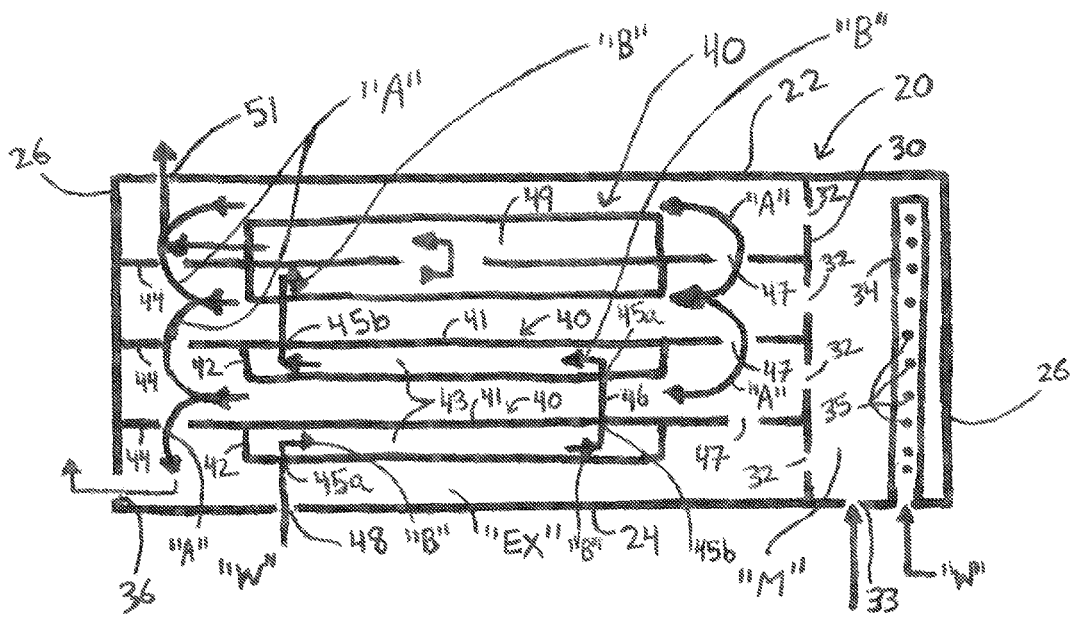
FIG. 3 is a cross-sectional view of the interior enclosure of the primary heat exchanger of FIG. 1.
Figure 6:
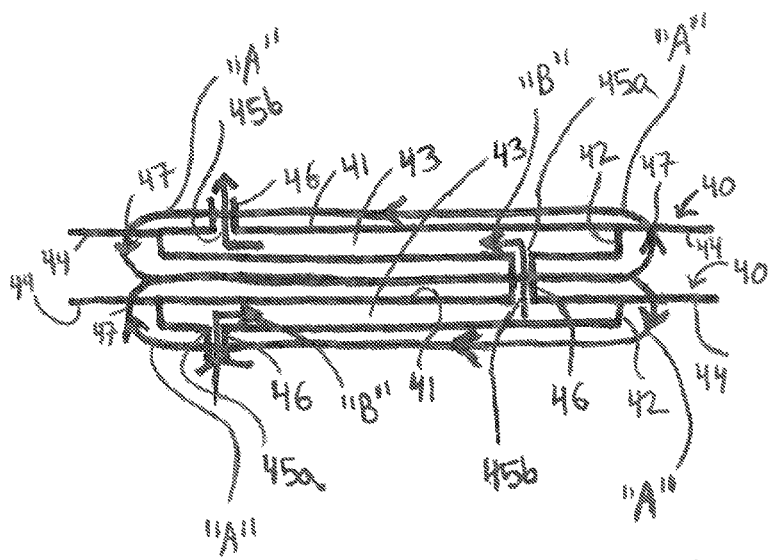
FIG. 6 is an enlarged cross-sectional view of adjacent magazines of the primary heat exchanger of FIG. 1.

Referring to FIGS. 1 and 2, the primary heat exchanger 10 generally includes an interior enclosure 20 configured to retain the source medium, and an exterior enclosure 60 that acts as a thermal barrier. The interior enclosure 20 is a six-panel enclosure comprised of a ceiling panel 22, a base 24, and four vertical walls 26. The panels are formed from stainless steel, although other suitable materials are also contemplated. Of particular importance is the ceiling panel 22, which is subject to the hottest temperatures and thermal stress resulting from expansion and contraction of the interior enclosure 20. To combat the thermal stress, the corner joints between the ceiling panel 22 and vertical walls 26 are not rigidly fastened. Rather, a gap is created by shortening the vertical walls 26 such that, as the ceiling panel 22 expands, it meets a spongy ceramic fiber blanket 28 surrounding the interior enclosure 20. The blanket 28 is held in place by steel angle pieces 29 disposed about the corner joints between the ceiling panel 22 and vertical walls 26. As the ceiling panel 22 expands, it squeezes the blanket 28 creating a seal and inhibiting the source medium from escaping. The blanket 28 may surround the entire interior enclosure 20 and be similarly configured with respect to the base 24 and respective corner joints between the base 24 and the vertical walls 26, even though the base 24 does not approach the high temperatures of the ceiling panel 22. The internal components of the interior enclosure 20 will be detailed below.

The exterior enclosure 60, similar to the interior enclosure 20, is made from six panels, e.g., a ceiling 62, a base 64, and four vertical walls 66 that cooperate to define a second enclosure. The exterior box 60 is made of aluminum, or other suitable material, and forms a sealed interior area 67 about the interior box 20 that contains the blanket 28 and still air (i.e., insulation material). As such, the exterior box 60 acts as a thermal barrier configured to help contain the source medium and prevent heat loss. The exterior box 60 further includes a plurality of extrusions formed therein that are enclosed via an outer aluminum skin 68. These extrusions in the exterior box 60, together with the skin 68, enclose still air (i.e., insulation material) to provide insulation cavities 69 adjacent the ceiling 62 and vertical walls 66 of the exterior box 60 to further insulate primary heat exchanger 10. The exterior box 60 also provides a rigid structure capable of being connected to the other components of the boiler or system, etc., e.g., via threaded rods extending through the exterior box 60 and insulation cavities 69, as illustrated by lines "R" in FIG. 2, although other suitable mechanical engagement mechanisms are also contemplated.

With reference to FIGS. 3-6, the interior box 20 is partitioned by one or more baffle plates 30, or other suitable separator, to define a heat exchange area "EX" occupying the vast majority of the volume of the interior box 20, and a mixing area "M," which occupies a small minority of the volume of the interior box 20. Orifices 32 in the baffle plates 30 enable communication between the heat exchange area "EX" and the mixing area "M." With respect to the mixing area "M," a fume input 33 is defined through the primary heat exchanger 10 that provides a path through which the hot gaseous fume can be delivered from the fume generator 101 (see, e.g., FIG. 7) into the mixing area "M." One or more feeding tubes 34, of stainless steel or other suitable material, extend into the mixing area "M" to connect a water source "W," e.g., a public water source or other suitable pressurized water source, with the mixing area "M." Each feeding tube 34 includes a plurality of pinhole apertures 35 defined therethrough. These pinhole apertures 35 are sufficiently small to only permit passage of water therethrough in the form of droplets of individual water molecules. The individual water molecule droplets passing through the pinhole apertures 35 of the feeding tube 34 form a mist that is spewed into the mixing area "M." Since a droplet formed from a single water molecule is lighter than the hot gaseous fume, the droplets are suspended, or float in the hot gaseous fume. As a result, the mist of individual water droplets is readily mixed with the hot gaseous fume within the relatively small mixing area "M" such that the droplets are vaporized to form a fume/droplet vapor mixture (as a result of inelastic collisions therebetween). This mixture is permitted to enter the heat exchange area "EX" through the orifices 32 in the baffle plates 30, as detailed below.

Figure 4:
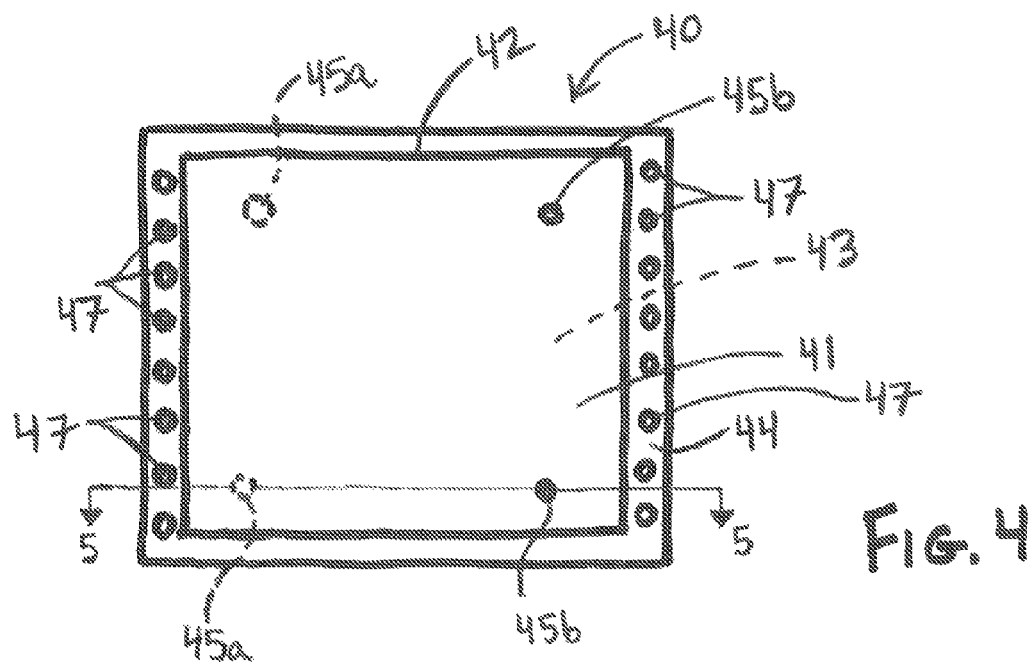
FIG. 4 is a top view of one of the magazines of the primary heat exchanger of FIG. 1.

As shown in FIG. 4, the heat exchange area "EX" of the interior box 20 of the primary heat exchanger 10 houses a plurality of heat exchange magazines 40 stacked and vertically spaced-apart relative to one another. The heat exchange area "EX" further includes a waste outlet 36 disposed opposite the mixing area "M" towards the base 24 of the interior box 20. The waste outlet 36 allows cooler, "waste" fume to exit the primary heat exchanger 10 to a chimney 180 (see, e.g., FIG. 7). This is due to the fact that relatively cooler $N_2$ and $CO_2$ molecules (from the fume) are heavier than the hot droplets of $H_2O$ vapor and, thus, these "waste" gases tend to descend and exit via the chimney 180 (see, e.g., FIG. 7).

The number of magazines 40 is variable, depending on a particular purpose. Regardless of the number of magazines 40, each pair of adjacent magazines 40 is positioned relative to the baffle plates 30 such that an orifice 32 of the baffle plates 30 is disposed therebetween. This configuration enables the mixture to enter the heat exchange area "EX" between each pair of adjacent magazines 40 and, as a result, ensures maximum temperature differentials between the heat exchange area "EX" and the interior cavities 43 of the magazines 40.

Each magazine 40 is formed from a thermally-conductive material, e.g., stainless steel, and defines a plate-like configuration. The base of each magazine 40 defines a recessed portion 42 that forms a cavity 43. The recessed portion 42 of each magazine 40 is surrounded about its outer periphery by a flange 44. A cover 41 is disposed about the recessed portion 42 to fully enclose the cavity 43. The cavity 43 defines a shallow depth compared to the length and width of the magazine 40, thus maximizing the surface area of receiver medium disposed within the cavity 43. As such, the cavity 43 of each magazine 40 is configured to hold a minimal amount of receiver medium. Equal length and width dimensions of the cavity 43 are also desirable to provide a maximum area within a given perimeter.

The cavity 43 is enclosed by the magazine 40 except for a plurality of apertures 45a, 45b disposed towards opposing sides of the magazine 40. The apertures 45a on one side are defined through the bottom of the magazine 40 and act as the inlet into the cavity 43, while the apertures 45b on the other side are defined through the top of the magazine and act as the outlet from the cavity 43. These inlet and outlet apertures 45a, 45b enable the flow of receiver medium into the cavity 43, across the magazine 40, and out of the cavity 43. As can be appreciated, adjacent magazines 40 are oppositely configured such that the inlet and outlet apertures 45a, 45b of adjacent magazine 40 can readily communicate with one another. More specifically, piping 46 interconnects these inlet and outlet apertures 45a, 45b of adjacent magazines 40, establish a path for the receiver medium.

As a result of the above configuration, this path is defined in a zig-zag or back and forth pattern wherein the receiver medium moves in a first direction through the cavity 43 of one magazine 40, up through the piping 46 into an adjacent magazine 40, through the cavity 43 of the adjacent magazine 40 in a second, opposite direction, and so forth. The spacing defined between each pair of adjacent magazines 40 is substantially equal to the depth of the cavities 43 of magazines 40 such that the area through which the receiver medium travels within the cavity 43 is similar to the area between the magazines 40 through which the mixture circulates.

Apertures 47 defined through the flanges 44 of the magazines 40 on opposite sides thereof enable the mixture to also move vertically between the magazines 40. As noted above, the orifices 32 in the baffle plates 30 allow the mixture to enter the heat exchange area "EX" between any of the magazines 40, i.e., the mixture is not limited to entry at the base 24 of the interior box 20 of the heat exchanger 10.

Figure 5:
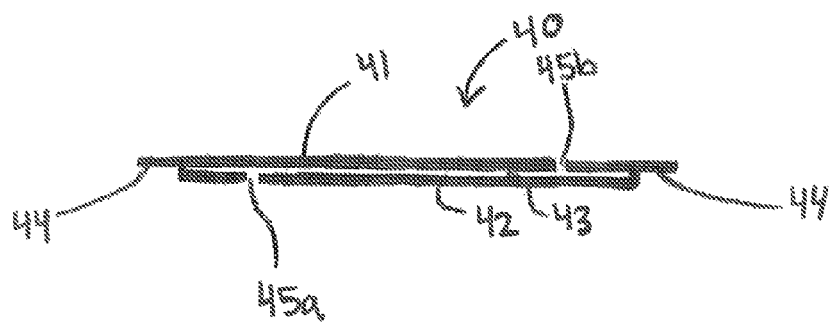
FIG. 5 is a cross-sectional view of the magazine of FIG. 4, taken along section line "5-5" of FIG. 4.

The plurality of magazines 40 are similar to one another except that the lower-most magazine 40, e.g., the bottom tier, includes a feed line 48 coupled thereto for enabling receiver medium to be pumped from a source, e.g., the pressurized public water source "W," into the primary heat exchanger 10 and, more specifically, into the cavity 43 of the lower-most magazine 40 and up through the plurality of magazines 40. Referring to FIG. 5, the upper-most magazine 40, e.g., the top tier, is different from the other magazines 40 in that it defines an enlarged cavity 49 including spacers that separate the vapor (on top, above the spacers) and liquid (on the bottom, below the spacers), thus functioning as an evaporator. A first output line 51 may be provided to guide the vapor from the upper-most magazine 40 and/or a second output line (not explicitly shown) may be provided in the bottom portion of the enlarged cavity 49 to allow for the output of the hot liquid.

In use, the fume, e.g., hot gaseous $N_2$ and $CO_2$ fume molecules produced via combustion of a fossil fuel, is input into the mixing area "M," along with the mist of individual water molecule droplets, which are pumped from the water source "W" into the mixing area "M" through the pinhole apertures 35 of the feeding tubes 34. Via inelastic collisions between the $N_2$ and $CO_2$ fume molecules with the water droplets, the droplets are heated sufficiently to transform into vaporous $H_2O$ molecules, which behave as gases. More specifically, in the mixing area "M," the mist of water droplets, acting like a humidifier, immediately collides with the gaseous fume and heats up to become hotter droplets. As the water droplets reach 212° F., they evaporate as vapor. These vaporized $H_2O$ droplets thus form a mixture with the hot fume.

The mixing area "M" behaves according to the ideal gas law. Thus, the smaller the volume, the greater the pressure/temperature (P/T) ratio or energy density (BTU/ft$^3$). Accordingly, as noted above, the relatively minimal volume of the mixing area "M" as compared to the heat exchange area "EX" enables the mixing area "M" to reach higher temperatures as compared to a larger mixing area.

The mixture is guided into the heat exchange area "EX" through the orifices 32 in the baffle plates 30 and is swept about and between the magazines 40. Once disposed within the heat exchanger area "EX," the mixture circulates in a vortex both horizontally between the magazines 40 and vertically relative to the magazines 40 through the aperture 47 of the flanges 44 of the magazines 40, as indicated by arrows "A." At the same time, or near thereto, pump pressure forces the liquid water receiver medium into the cavity 43 of the first magazine 40 and up through the plurality of tiers of magazines 40 in an upward zig-zag spiral, as indicated by arrows "B." As noted above, since the mixture circulates in a vortex about the magazines 40 and enters the heat exchange area "EX" between each pair of adjacent magazine 40, and since the receiver medium travels in an upward zig-zag spiral, a maximum temperature differential is maintained therebetween for each magazine 40.

The mixture circulating around the magazines 40, after violent collisions, impinges on the colder metallic surfaces of the magazines 40 causing the vapor droplets to condense after losing heat through the magazines 40 to the receiver medium being pumped through the magazines 40. More specifically, as the mixture vortex circulates, the boundary layer gaseous molecules on the metallic surfaces of the magazines 40 are replaced by condensed liquid droplets from the mixture. The metallic surfaces of the magazines 40, when coated with this condensed liquid, become much better thermal conductors and can store much more energy (several orders of magnitude). Such wet surfaces also contain more heat energy than a gaseous medium. The ratio of density ($\rho$) to specific heat (Cp) (about 6000/1) further impacts the condensed liquid droplets on the surfaces of the magazines 40, causing them to recombine until they become cold enough to fall like rain, with a cascade of heat transfer occurring. The remaining fume of $CO_2$ and $N_2$, after impacting with the surfaces of the magazines 40, loses energy to the droplets, becoming both colder and heavier. As a result, these colder, heavier "waste" gas molecules sink towards the base of the primary heat exchanger 10, ultimately exiting to the chimney 180 (see, e.g., FIG. 7).

As a result of the above-detailed configuration, as the receiver medium travels in an upward zig-zag spiral through the plurality of magazines 40, the temperature of the receiver medium is incrementally raised after each step of elevation to the next magazine 40 in the tier, ultimately reaching the upper-most magazine 40 for output as vapor as hot as 700° F., output as hot liquid, and/or for use in conductive heating. The number of magazine 40, dimensions of the primary heat exchanger 10, flow rate of the receiver medium, and/or fume temperature can be configured to establish a particular maximum temperature at the upper-most magazine 40 and/or a specific incremental temperature for each step. Various embodiments of boilers and systems incorporating the primary heat exchanger 10 in a particular configuration suitable for the particular purposes of the boilers and systems are detailed below.

Home Heating Systems

Figure 7:
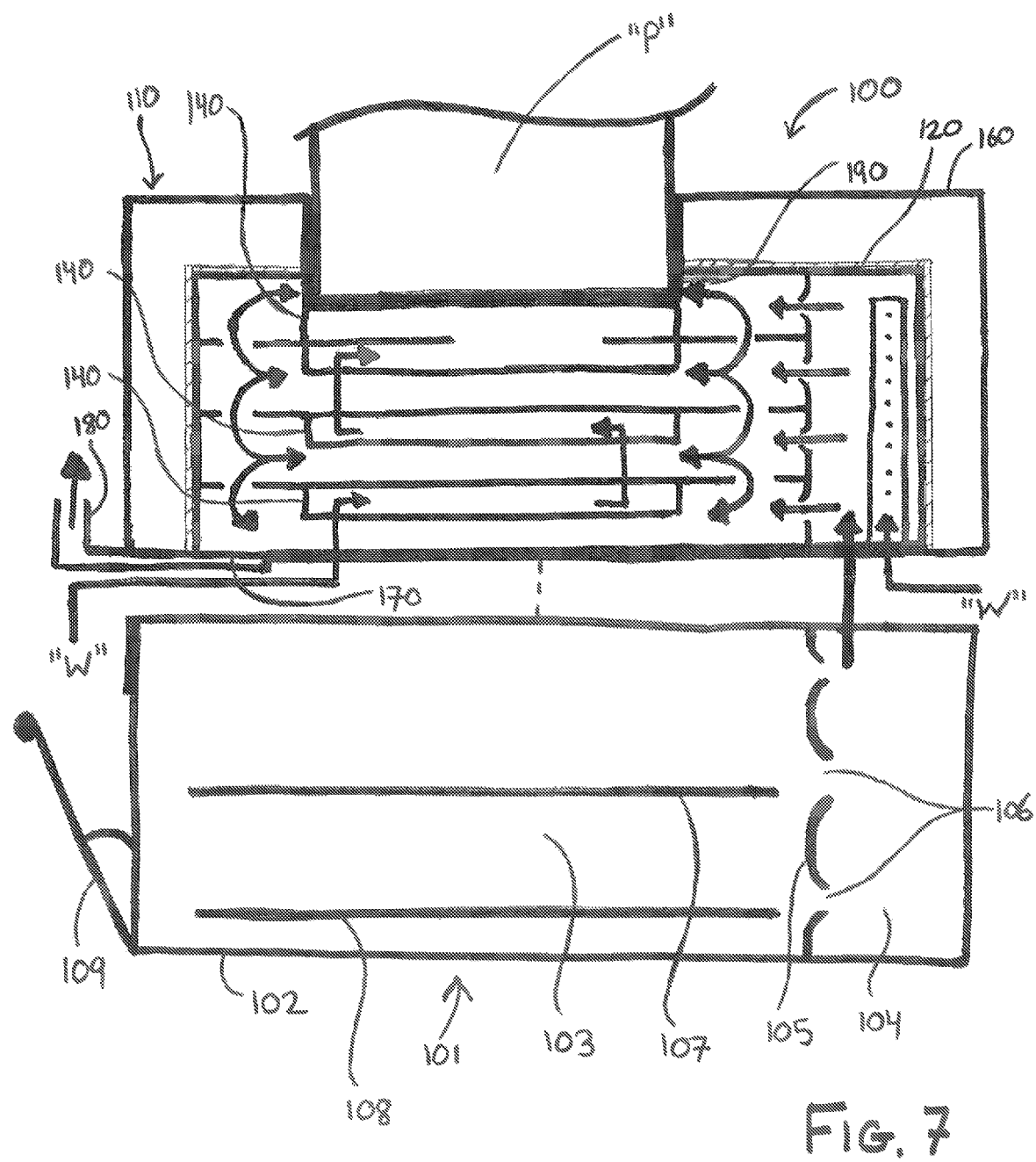
FIG. 7 is a cross-sectional view of a boiler of a home heating system provided in accordance with the present disclosure, wherein the fume generator and primary heat exchanger are shown separated from one another.

In accordance with one exemplary embodiment of the present disclosure, a boiler 100 for a stove system or home heating system is provided. As shown in FIG. 7, the boiler 100 includes a fume generator 101 and a primary heat exchanger 110. The fume generator 101 includes a housing 102 that houses a combustion chamber 103 and a gathering chamber 104. These chambers 103, 104 are separated by a baffle plate 105, or other suitable divider, having a plurality of orifices 106. The combustion chamber 103 includes a wire grid 107 configured to support a fossil fuel for combustion, e.g., coal pellets. The wire grid 107 is porous to allow ash from the combusted coal pellets to fall therethrough and into the collecting tray 108. Tray 108 is removable to allow cleaning of the housing 102, e.g., removal of the ash. A door 109 is provided for providing access to the combustion chamber 103. The gathering chamber 104 is coupled to the fume input of the primary heat exchanger 110.

In use, coal pellets or another suitable fuel is loaded onto the wire grid 107 and burned. As the coal is burned, heat energy, in the form of a fume, is guided towards baffle plate 105 and accelerated through the orifices 106 into the gathering chamber 104. From the gathering chamber 104, the fume travels upwardly through the fume input of the primary heat exchanger 110 and into the mixing area thereof. Coal is advantageous for use due to its favorable energy density as compared to other fuels, although other suitable fuels are also comtemplated.

The primary heat exchanger 110 of the boiler 100 is similar to the primary heat exchanger 10 (FIGS. 1-6) detailed above, and, thus, only the differences therebetween and particular configuration of the primary heat exchanger 110 will be described in detail hereinbelow for purposes of brevity. The primary heat exchanger 110 is configured to receive the fume produced by the fume generator 101 and includes three magazines 140. The primary heat exchanger 110 may be secured to the fume generator 101 via mechanical fastening, e.g., using rods, or may be separate therefrom. The primary heat exchanger 110 and the fume generator 101 define similar length and width dimensions such that, when engaged to one another, the boiler 100 defines a unit having consistent length and width dimensions. The primary heat exchanger 110 further includes a tunneled channel 170 extending along a portion of the base of the interior box 120. The channel 170 ultimately communicates with chimney 180, disposed externally of the exterior box 160, for allowing cooler "waste" fume molecules to escape from the primary heat exchanger 110.

The primary heat exchanger 110 is capable of running without electricity so long as there is a sufficiently pressurized water source "W," e.g., a public water line, for pumping the liquid water receiver medium into and up through the magazines 140. The same or a separate water source "W" of sufficient pressure is also required to enable the mist of droplets to be spewed into the mixing area of the primary heat exchanger 110.

As noted above, the primary heat exchanger 110 includes three magazines 140. The upper-most magazine 140 functions as an evaporator that separates the vapor (on top, above the spacers) and liquid (on the bottom, below the spacers). However, rather than outputting the vapor and/or hot liquid through an output, the upper-most magazine 140 is in thermal contact with a thermally-conductive pot-receiving recess 190. This recess 190 is configured to receive a pot "P," which may be a pot for cooking, a portable pot for hot water, or may be an enclosed pot of a hot-water heater.

In use, as mentioned above, the fume generator 101 guides the fume from the gathering chamber 104 into the mixing area of the primary heat exchanger 110, wherein it is mixed with the droplets to form a mixture, similarly as detailed above. This mixture is then circulated, in a vortex, about the magazines 140, which include the liquid water receiver medium being pumped in an upward zigzag spiral therethrough, as also detailed above. The temperature of the liquid water receiver medium is incrementally raised after each step, ultimately reaching the upper-most magazine 140 where the receiver medium is approximately 212° F. This 212° F. liquid water is converted into vapor or steam, and floats to the top of the upper-most magazine 140, adjacent the thermally-conductive recess 190 containing the pot "P." Via thermal conduction similarly as above, this steam heats up the water within the pot "P," up to approximately 212° F.

Figure 8:
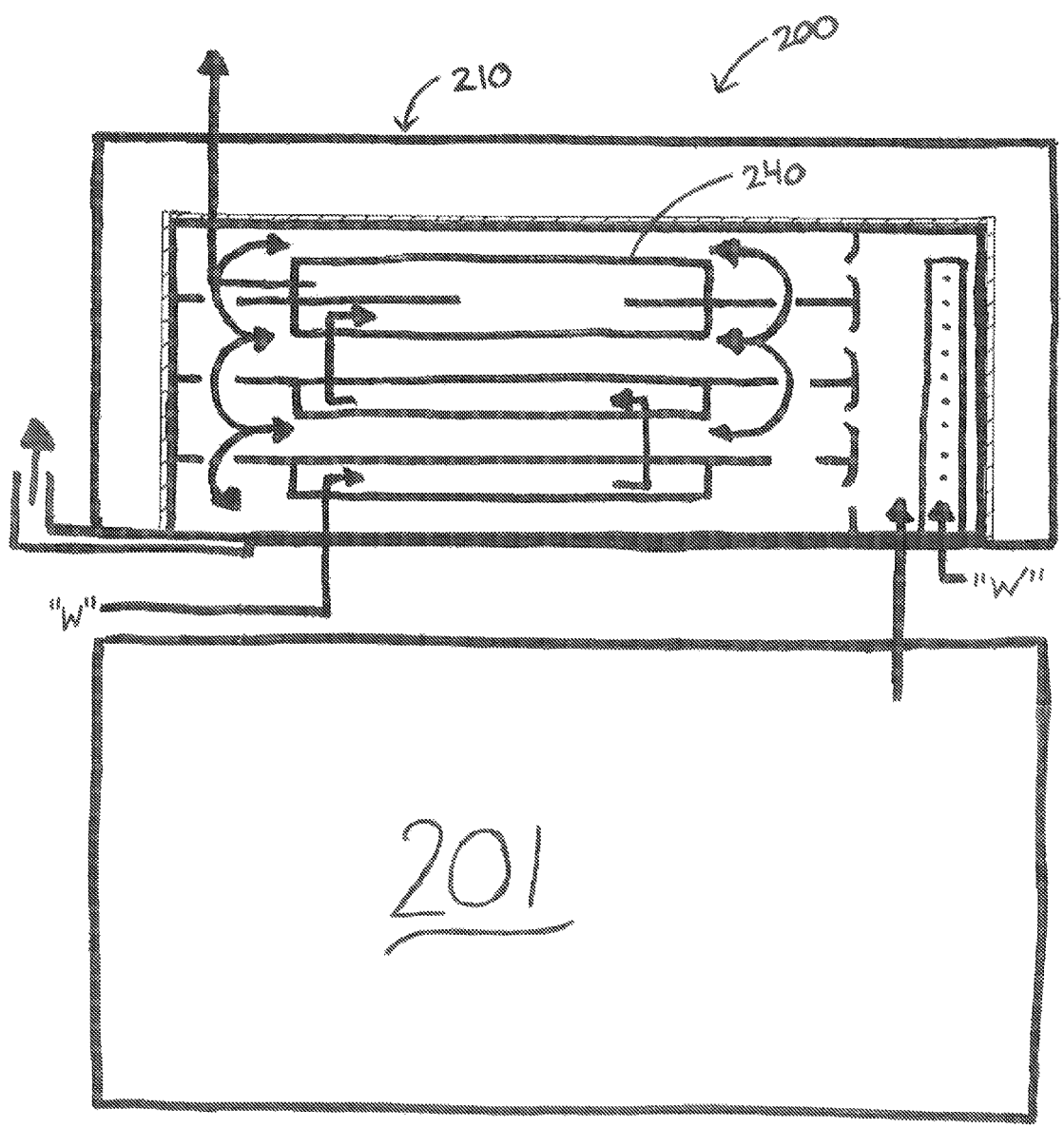
FIG. 8 is a cross-sectional view of another boiler of a home heating system provided in accordance with the present disclosure, wherein the fume generator and primary heat exchanger are shown separated from one another.

Turning to FIG. 8, another exemplary embodiment of a boiler 200 provided in accordance with the present disclosure is shown configured for use with a home heating system. The boiler 200 includes a fume generator 201, which may be similar to fume generator 101 (FIG. 7), or may be configured to produce a fume from natural gas or any other suitable fuel. The boiler 200 further includes a primary heat exchanger 210. The primary heat exchanger 210 of the boiler 200 is similar to primary heat exchanger 110 (FIG. 7), detailed above, and, thus, only the differences therebetween will be described in detail hereinbelow. In particular, the primary heat exchanger 210 differs from the primary heat exchanger 110 (FIG. 7) in that, rather than being configured to heat a pot of water, the primary heat exchanger 210 is configured to output vapor or steam from the upper portion of the cavity of the upper-most magazine 240. This steam may be input into a home heating system, e.g., a forced steam heat system, or may be directly coupled to one or more forced steam radiators, or may be utilized for any other suitable purpose.

Power Generating System

Figure 9:
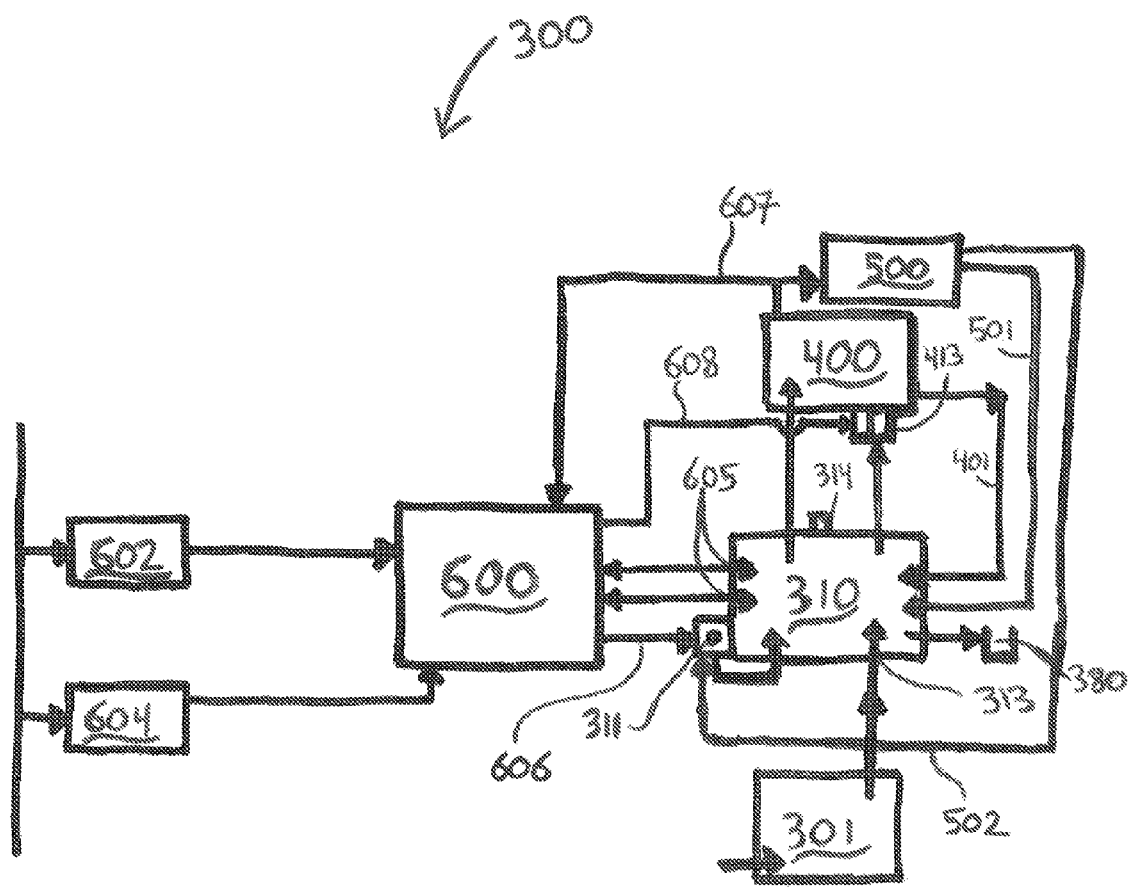
FIG. 9 is a schematic diagram of a power generating system provided in accordance with the present disclosure.

In accordance with another exemplary embodiment of the present disclosure, as shown in FIG. 9, the primary heat exchanger 10 (FIGS. 1-6) detailed above is incorporated into a power generating system 300 for providing superheated vapor to a steam turbine 500. In embodiments, the steam turbine 500 may be used to drive an electrical generator to produce electricity and function as a traditional power plant. Alternatively, the steam turbine 500 may be used to power an automobile and function as a mobile power plant, facilitated by the fact that the system 300 is compact and light, and can provide "on-demand" power. Other configurations are also contemplated. Regardless of the particular implementation, steam turbines are advantageous in that they are extremely efficient. However, despite this efficiency, traditional power generating systems using steam turbines are as a whole relatively inefficient because, although the steam turbine itself is efficient, the equipment and methods utilized to generate the superheated vapor to run the steam turbine are very inefficient. Thus, by correcting this inefficiency, the benefits of the efficient steam turbine can be realized.

Figure 10:
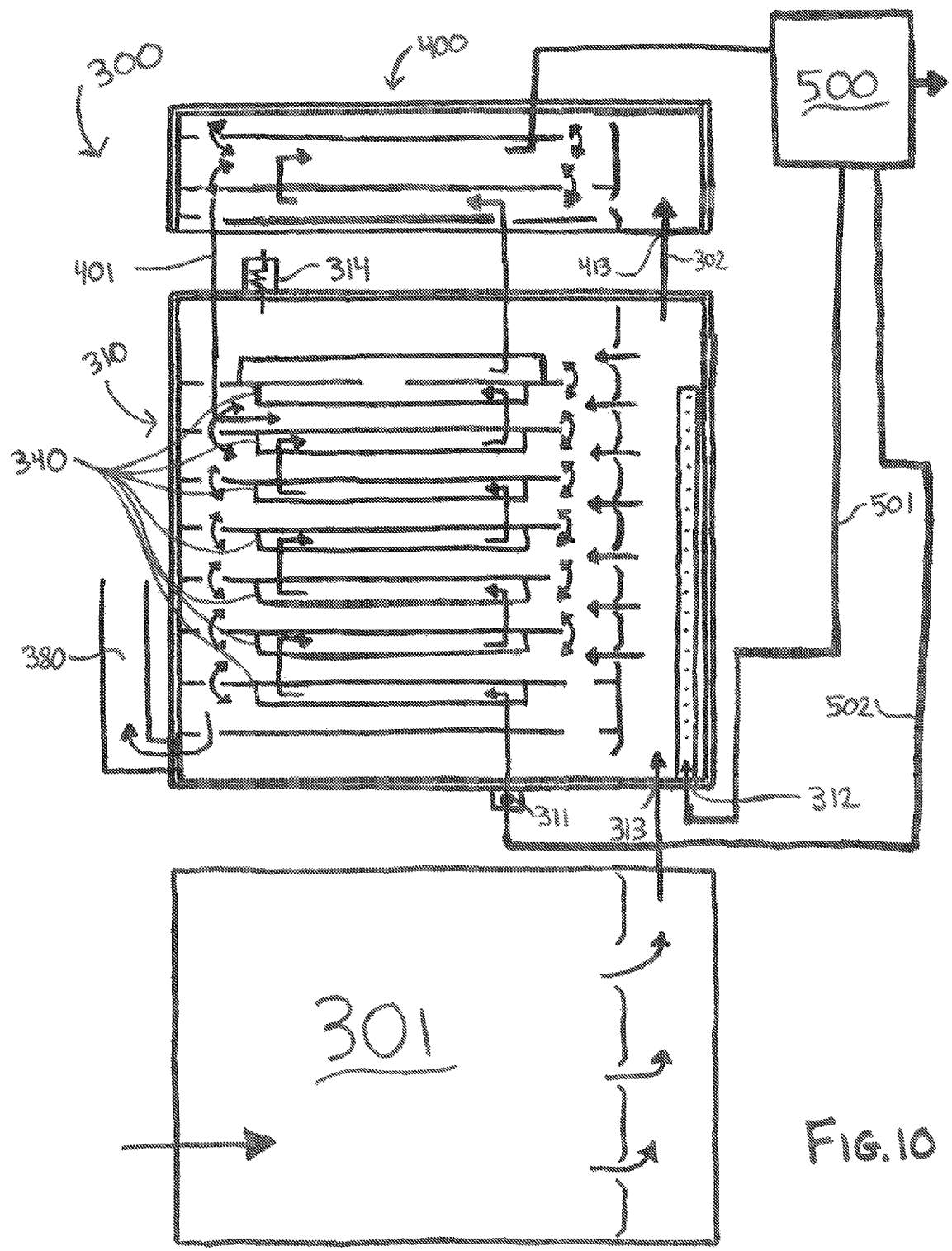
FIG. 10 is a cross-sectional view of the fume generator, primary heat exchanger, secondary heat exchanger, and steam turbine of the power generating system of FIG. 9.

With reference to FIGS. 9 and 10, the power generating system 300 generally includes a fume generator 301, a primary heat exchanger 310, a secondary heat exchanger 400 (these three together functioning as the boiler), a steam turbine 500, and a CPU 600. The fume generator 301, similarly as with the previous embodiments, includes a combustion chamber for receiving and burning a biomass, e.g., wood, coal, etc. Alternatively, the fume generator 301 may be configured to produce a hot gaseous fume using any other suitable fuel source, e.g., natural gas. The fume generator 301 channels the resulting fume to the primary heat exchanger 310.

The primary heat exchanger 310 of system 300 is similar to primary heat exchanger 10 (FIGS. 1-6) detailed above, and, thus, only the differences therebetween will be detailed hereinbelow. The primary heat exchanger 310 is the hub of the system and is configured to heat the liquid water receiver medium to a vapor at about 700° F. The primary heat exchanger 310 includes three actuators: a valve and pump assembly 311 configured to control the mass flow rate of the liquid water receiver medium fed back from the condenser unit (not explicitly shown) of the steam turbine 500 to the primary heat exchanger 310, as indicated by arrow 502; a valve assembly 312 (incorporating a pump, if necessary) configured to control the mass flow rate of the water or water vapor used to spew the mist of water droplets into the mixing area of the primary heat exchanger 310; and a check valve 313 configured to control the rate at which the fume enters the primary heat exchanger 310. The primary heat exchanger 310 further includes a chimney 380, the only exit within system 300, for outputting the cooler "waste" gas, and a centrifugal vapor collector (CVC) 314, which is installed adjacent the ceiling of the primary heat exchanger 310 and serves to inhibit the mixture from escaping the primary heat exchanger 310.

With respect to the heat exchange area of the primary heat exchanger 310, a plurality of magazines 340 are provided. For example, seven magazines 340 may be provided, each configured to raise the temperature of the receiver medium approximately 100° F. such that, at the uppermost magazine 340, the temperature of the receiver medium is approximately 700° F. The heating of the receiver medium is similar to that detailed above, with the addition that the mixture is supplemented by fume that descends from the secondary heat exchanger 400 and is returned to the mixing area of the primary heat exchanger 310, as indicated by arrows 401, and by hot water vapor that is returned from steam turbine 500 to the mixing area of the primary heat exchanger 310 (to be spewed through the pin holes or directly into the mixing area), as indicated by arrow 501. Further, as also mentioned above, the receiver medium is provided from the condenser unit (not explicitly shown) of the steam turbine 500, as indicated by arrow 502, such that system 300 is a substantially closed loop system. The vapor at approximately 700° F. produced by the primary heat exchanger 310 is directed to the secondary heat exchanger 400, e.g., via piping or other suitable conduit. The function of the primary heat exchanger 310 for heating the receiver medium to a vapor at 700° F. is similar to that detailed above, wherein the receiver medium zigzags up through the magazines 340 and is increasingly heated by the circulating mixture.

The secondary heat exchanger 400 is configured to receive the water vapor at 700° F. from the primary heat exchanger 310 and heat the water vapor to a superheated vapor, e.g., above 1000° F., using the hottest mixture from the mixing area of the primary heat exchanger 310 (which, being the lightest, travels up into the secondary heat exchanger 400), as indicated by arrow 302. A controllable valve 413 is provided for controlling the rate at which the mixture enters the secondary heat exchanger 400. In the secondary heat exchanger 400, resistance against heat transfer is minimized by allowing for direct, elastic collisions and, thus, heat exchange, between the hotter mixture and the vapor receiver medium. The most effective collisions are between the individual water vapor molecules of the mixture and the individual water vapor molecules that make up the receiver medium. As a result, the relatively cooler fume gases ($N_2$ and $CO_2$) descend and are directed back into the mixing area of the primary heat exchanger 310 (as indicated by arrow 401), where they are sufficiently hot to mix with the droplets and supplement the heating of the receiver medium within the primary heat exchanger 310.

The secondary heat exchanger 400 defines a reduced volume as compared to the primary heat exchanger 310, thus facilitating the heating of the receiver medium to at least 1000° F. to create the required superheated vapor. However, this volume reduction is in the height dimension of the secondary heat exchanger 400, as the fume generator 301, primary heat exchanger 310, secondary heat exchanger 400 define similar length and width dimensions so as to form a boiler unit having a consistent footprint. Once the superheated vapor is created within the secondary heat exchanger 400, it is guided to the steam turbine 500. The steam turbine 500 utilizes the superheated vapor from the secondary heat exchanger 400 to, for example, drive an electrical generator, power an automobile, etc.

The CPU 600 enables "smart" control of the system 300 and receives power from a switching D.C. power supply 602 and/or a rechargeable battery 604 (for mobile systems or in the event of power failure). In particular, the CPU 600 controls the system 300 using feedback from a plurality of sensors associated with the fume generator 301, the primary heat exchanger 310, the secondary heat exchanger 400, and/or the steam turbine 500. For example, a plurality of sensors 605 are positioned within the primary heat exchanger 310 to sense the temperature of the receiver medium within different magazines 340. Based on a comparison of the sensed temperatures with the desired temperatures for the particular position of the magazine 340 (or using any other suitable metric or algorithm), the CPU 600 controls the valve and pump assembly 311, as indicated via the control line 606, to increase (where the temperatures are hotter than the target temperatures) or decrease (where the temperatures are cooler than the target temperatures) the flow rate of the receiver medium up through the magazines 340. Another sensor 607 (or a plurality of sensors 607) associated with the output of the secondary heat exchanger 400 and input into the steam turbine 500 is utilized to ensure the superheated vapor is of sufficient temperature. Based upon feedback from the sensor 607, the CPU 600 controls controllable valve 413 to increase or decrease the flow rate of the mixture into the secondary heat exchanger 400, as indicated by arrow 608. Other suitable sensors are also contemplated. The target temperature data and/or other comparison data for the sensors may be collected based upon prior experimentation or dynamically collected during operation, and is stored in a memory associated with the CPU 600.

It will be understood that various modifications may be made to the embodiments of the present disclosure. Therefore, the above description should not be construed as limiting, but merely as exemplifications of embodiments. Those skilled in the art will envision other modifications within the scope and spirit of the present disclosure.

What is claimed is:

1. A heat exchanger comprising:
a first enclosure defining a volume;
a separator disposed within the first enclosure and extending vertically within the first enclosure to divide the volume of the first enclosure into a mixing area and a heat exchange area, the separator defining a plurality of orifices, wherein the mixing area of the first enclosure is configured to receive a hot fume and droplets of a liquid for mixing with each other to form a fume-droplet vapor mixture within the mixing area of the first enclosure, the fume-droplet vapor mixture configured to pass horizontally through the orifices of the separator into the heat exchange area of the first enclosure; and
a plurality of magazines disposed within and stacked vertically within the heat exchange area of the first enclosure, the plurality of magazines including a lower-most magazine, an upper-most magazine, and at least one intermediate magazine disposed therebetween, each magazine including a horizontally-oriented plate defining a recess and a cover disposed about the recess of the plate to define and enclose a cavity therebetween, the cavities of the magazines disposed in communication with one another, the lower-most magazine configured to receive a receiver medium that is pumped through the cavity of each successive magazine from the lower-most magazine to the upper-most magazine in an upward zig-zag spiral, wherein the fume-droplet vapor mixture is configured to circulate within the heat exchange area of the first enclosure and about the magazines to incrementally heat the receiver medium as the receiver medium is pumped through the cavity of each successive magazine,
wherein the orifices defined through the separator are arranged to permit the fume-droplet vapor mixture to flow horizontally through the orifices of the separator from the mixing area into the heat exchange area between each pair of adjacent magazines.

2. The heat exchanger according to claim 1, wherein the separator includes at least one baffle plate.

3. The heat exchanger according to claim 1, further comprising a feeding tube extending at least partially through the mixing area, the feeding tube configured to connect to a source of liquid for providing the liquid, the feeding tube defining a plurality of pin holes through which the liquid is urged to spew the droplets of the liquid into the mixing area.

4. The heat exchanger according to claim 1, wherein the liquid is water and wherein the receiver medium is water.

5. The heat exchanger according to claim 4, wherein the upper-most magazine is configured to output water vapor.

6. The heat exchanger according to claim 1, wherein a depth of the cavity of at least one of the magazines is equal to a vertical spacing between adjacent magazines.

7. The heat exchanger according to claim 1, wherein the upper-most magazine is configured as an evaporator having an enlarged cavity defining an upper portion and a lower portion, the upper portion retaining vapor and the lower portion retaining liquid.

8. The heat exchanger according to claim 1, further including a plurality of panels, a flexible coupling, and a sealing blanket, the first enclosure formed from the plurality of panels, at least two panels of the plurality of panels defining a gap therebetween and being joined via the flexible coupling, the sealing blanket disposed within the gap defined between the at least two panels.

9. The heat exchange according to claim 1, further comprising a second enclosure disposed about the first enclosure and defining an insulative area therebetween.

10. The heat exchanger according to claim 1, further comprising a chimney outlet defined towards the base of the first enclosure within the heat exchange area thereof, the chimney outlet configured to enable the flow of a cooled mixture out of the heat exchange area.

11. A boiler for a home heating system, comprising:
a fume generator configured to produce a hot fume; and
a heat exchanger coupled to the fume generator, the heat exchanger including:
an enclosure defining an interior area;
a separator disposed within the enclosure and extending vertically within the enclosure to divide the interior area of the enclosure into a mixing area and a heat exchange area, the separator defining a plurality of orifices, wherein the mixing area is configured to receive the hot fume from the fume generator and droplets of a liquid for mixing with each other to form a fume-droplet vapor mixture within the mixing area of the enclosure, the fume-droplet vapor mixture configured to pass horizontally through the orifices of the separator into the heat exchange area of the enclosure; and
a plurality of magazines disposed within and stacked vertically within the heat exchange area of the enclosure, the plurality of magazines including a lower-most magazine, an upper-most magazine, and at least one intermediate magazine disposed therebetween, each magazine including a horizontally-oriented plate defining a recess and a cover disposed about the recess of the plate to define and enclose a cavity therebetween, the cavities of the magazines disposed in communication with one another, the lower-most magazine configured to receive a receiver medium that is pumped through the cavity of each successive magazine from the lower-most magazine to the upper-most magazine in an upward zig-zag spiral, wherein the mixture is configured to circulate within the heat exchange area of the enclosure and about the magazines to incrementally heat the receiver medium as the receiver medium is pumped through the cavity of each successive magazine,
wherein the orifices defined through the separator are arranged to permit the fume-droplet vapor mixture to flow horizontally through the orifices of the separator from the mixing area into the heat exchange area between each pair of adjacent magazines.

12. The boiler according to claim 11, further including a pot, the upper-most magazine disposed in thermal communication with the pot, the heated receiver medium configured to heat water disposed within the pot to about 212° F.

13. The boiler according to claim 11, wherein the upper-most magazine is configured to output vapor to a home heating system.

14. The boiler according to claim 11, wherein the fume generator includes a housing having a divider disposed therein that divides the housing into a combustion chamber and a gathering chamber, the combustion chamber configured to receive fuel to be burned to produce a hot fume, the hot fume configured to pass through apertures defined within the divider and into the gathering chamber for output to the heat exchanger.

15. A power generating system comprising:
a fume generator configured to produce a hot fume;
a primary heat exchanger coupled to the fume generator, the primary heat exchanger including:
an enclosure defining a volume;
a separator disposed within the enclosure and extending vertically within the enclosure to divide the volume of the enclosure into a mixing area and a heat exchange area, the separator defining a plurality of orifices, wherein the mixing area of the enclosure is configured to receive the hot fume from the fume generator and droplets of a liquid for mixing with each other to form a fume-droplet vapor mixture within the mixing area of the enclosure, the mixture configured to pass horizontally through the orifices of the separator into the heat exchange area of the enclosure; and
a plurality of magazines disposed within and stacked vertically within the heat exchange area of the first enclosure, the plurality of magazines including a lower-most magazine, an upper-most magazine, and at least one intermediate magazine disposed therebetween, each magazine including a horizontally-oriented plate defining a recess and a cover disposed about the recess of the plate to define and enclose a cavity therebetween, the cavities of the magazines disposed in communication with one another, the lower-most magazine configured to receive a receiver medium that is pumped through the cavity of each successive magazine from the lower-most magazine to the upper-most magazine in an upward zig-zag spiral, wherein the mixture is configured to circulate within the heat exchange area of the enclosure and about the magazines to incrementally heat the receiver medium as the receiver medium is pumped through the cavity of each successive magazine, the upper-most magazine configured to output vapor at about 700° F.,
wherein the orifices defined through the separator are arranged to permit the fume-droplet vapor mixture to flow horizontally through the orifices of the separator from the mixing area into the heat exchange area between each pair of adjacent magazines;
a secondary heat exchanger configured to receive the vapor output from the upper-most magazine of the primary heat exchanger, heat the vapor to a superheated vapor of at least 1000° F., and output the superheated vapor; and
a steam turbine configured to receive the superheated vapor from the secondary heat exchanger and utilize the superheated vapor to drive an electrical generator.

16. The power generating system according to claim 15, wherein the steam turbine is configured to at least one of: return liquid water to the primary heat exchanger as the receiver medium and return liquid water to the primary heat exchanger as the liquid from which the droplets of liquid are produced.

17. The power generating system according to claim 15, wherein the secondary heat exchanger is configured to receive relatively hotter mixture from the primary heat exchanger for heating the vapor and to return relatively cooler mixture to the primary heat exchanger to facilitate heating of the receiver medium within the primary heat exchanger.

* * * * *